May 19, 1936.  M. FRISCH  2,040,930
DISTRIBUTING MECHANISM
Filed Dec. 31, 1930   2 Sheets—Sheet 1
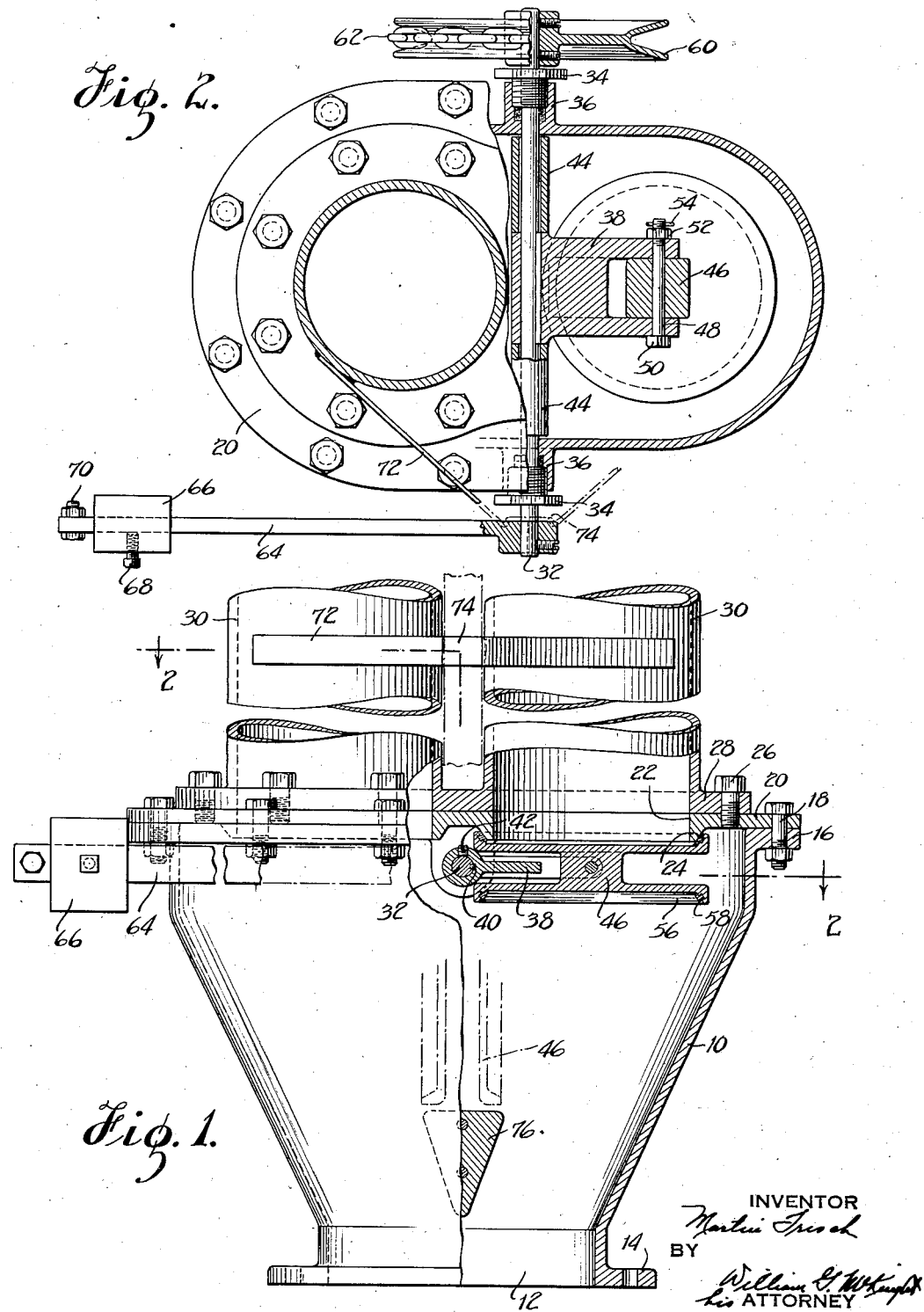

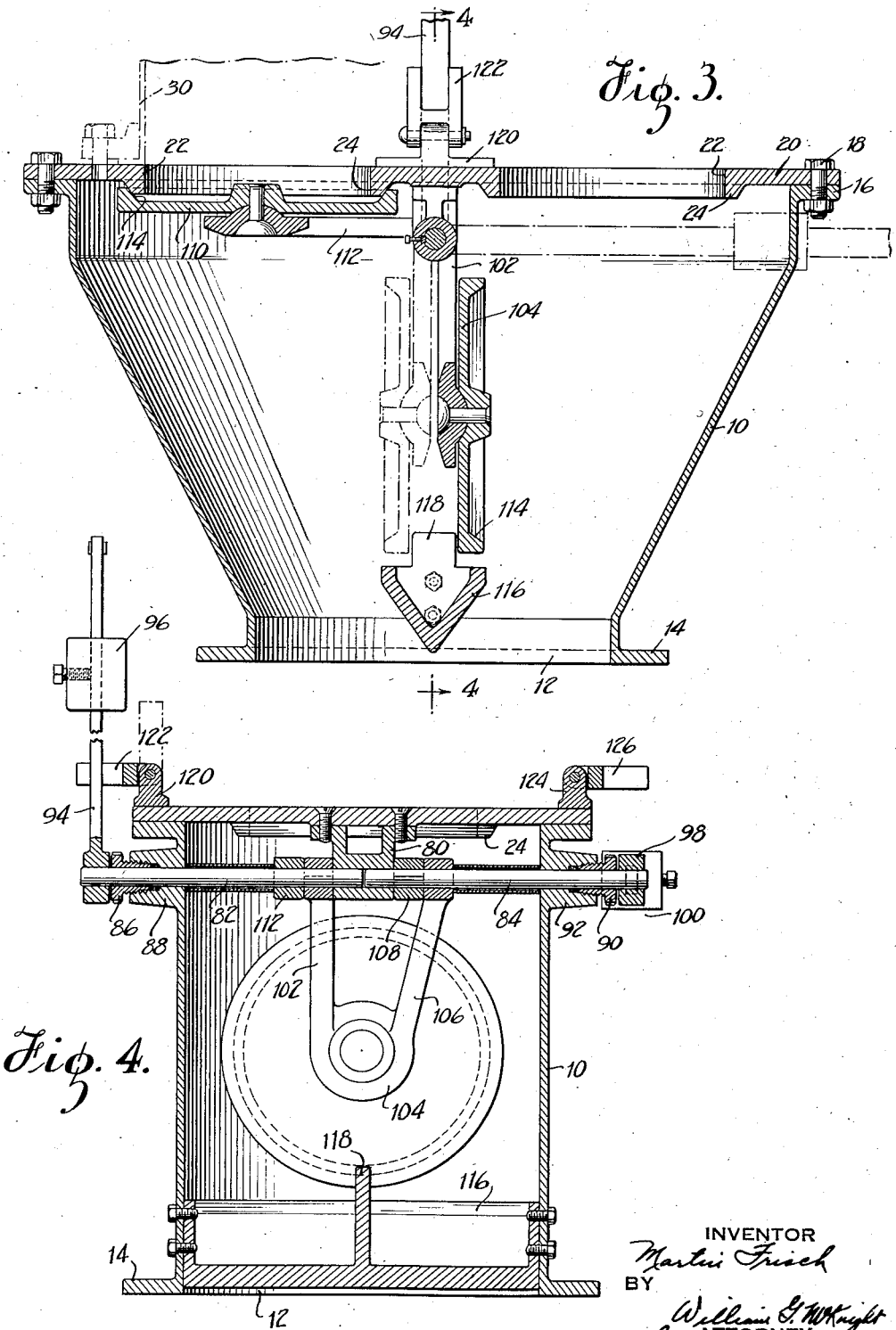

Patented May 19, 1936

2,040,930

UNITED STATES PATENT OFFICE 2,040,930

DISTRIBUTING MECHANISM

Martin Frisch, Bronx, N. Y., assignor to Foster Wheeler Corporation, New York, N. Y., a corporation of New York Application December 31, 1930, Serial No. 505,701

15 Claims. (Cl. 277—52)

My invention relates to the art of burning pulverized fuel and more particularly to means for distributing pulverized fuel among a plurality of burners.

My invention relates to a distributing valve whereby a mixture of pulverized fuel and air supplied from a source may be distributed to either or both of two burners, which burners may therefore be operated independently of each other. Among the objects of my invention are to provide a distributing valve of this type which is simple and sturdy. A particular object of my invention is to provide, in a valve of this type, valve seat faces so arranged that they will at no time be in the fuel stream and accordingly will not be subjected to wear resulting from abrasive action of fuel.

Further objects and advantages of my invention will be apparent from the following description considered in connection with the accompanying drawings, which form a part of this specification and on which:

Fig. 1 is a view, partially in cross-section, showing one form of distributing valve;

Fig. 2 is a cross-sectional view taken on the line 2—2 of Fig. 1;

Fig. 3 is a cross-sectional view of another form of a distributing valve; and

Fig. 4 is a cross-sectional view taken on the line 4—4 of Fig. 3.

Referring more particularly to Fig. 1, reference character 10 designates a hollow housing provided with an inlet opening 12 at one end thereof. Housing 10 is provided with a flange 14 around inlet 12 to which may be secured a fuel conduit.

The other end of housing 10 is provided with a flange 16 to which is secured, by means of bolts 18, a closure member 20. Member 20 is provided with a pair of outlet openings or ports 22. Formed on the inner face of closure member 20 around each outlet opening 22 is a projecting rim 24. The outer periphery of rim 24 is in the form of a truncated cone and is finished as by machining to form a valve seat face. Secured to the outer side of closure member 20 by means of bolts 26 is a flange 28 which is made integral with a pair of conduits 30. Obviously, conduits 30 may be made separately and formed with separate flanges which are bolted to closure member 20.

Extending laterally through housing member 10 is a shaft 32 mounted in bushings 34 which are screwed into bosses 36 formed on the outside of housing 10. Secured to the central part of shaft 32 within housing 10 is an arm 38 which is secured to the shaft by means of a key 40 and a set screw 42. A pair of sleeves 44 may be mounted on shaft 32 between arm 38 and the sides of housing 10 in order to substantially prevent lateral movement of the shaft. Pivotally mounted on the other end of arm 38 is a valve member 46. Valve member 46 is secured to arm 38 by means of a bolt 48 passing through the arm and the valve member and provided with a head 50 on one end and a nut 52 retained by a cotter key 54 on the other end.

The valve member 46 is provided with two circular valve faces 56 located on opposite sides of the valve member. Valve faces 56 are cone-shaped to correspond to the cone-shaped valve face seats formed on rim 24. Faces 56 may be lined with a soft bearing metal 58 or the material of the valve member may be machined to fit the valve face seat formed on rim 24.

Both ends of shaft 32 extend through the wall of housing 10 and on one end of the shaft there is secured a wheel 60 which is adapted to receive a chain 62 for rotating the wheel. Secured to the other end of shaft 32 is an arm 64 which carries a counter-weight 66 which may be moved along the arm and may be retained in any desired position by means of a set screw 68. A bolt 70 extending through the end of arm 64 prevents counter-weight 66 from sliding off the end of the arm if the set screw 68 becomes loosened. A V-shaped member 72 made of resilient material has one end secured in any suitable way to each of the conduits 30. Member 72 is preferably welded to these conduits. The apex of the V is flattened and recessed as is shown at 74, the width of the recess being sufficient to accommodate arm 64.

Secured within housing 10 near the inlet opening 12 therein is a wedge-shaped member 76, the base of which is wide enough so that valve member 46 will not extend beyond the edges thereof when in the position shown by dash-and-dot lines in Fig. 1.

The operation of the above described device is as follows:

Powdered fuel carried by a blast of air is supplied to inlet opening 12 of housing 10. With the valve in the position shown in full in Fig. 1, all of this fuel and air will pass out of housing 10 through the left hand conduit 30 inasmuch as the outlet to the right hand conduit 30 is closed by the valve member 46. Valve member 46 is held in closed position by means of the counter-weight 66 mounted on arm 64 which tends to rotate shaft 32 in a counter-clockwise direction and hence holds one of the valve faces 56 of valve member 46 in close contact with the valve seat face formed on rim 24. Inasmuch as valve member 46 is pivoted to arm 38 it will seat freely on the valve face seat. The force of the blast of air carrying the powdered fuel also tends to hold valve member 46 in closed position. Inasmuch as the valve seat face formed on rim 24 is formed on the outer periphery of this rim the stream of powdered fuel passing through the opening 22 into left hand conduit 30 will not pass in contact with the left hand seat. Hence the valve face seat will not be worn by the abrasive action of the powdered fuel.

If it is desired to supply powdered fuel to both of the conduits 30, chain 62, which extends to within a convenient distance of the floor is pulled in such a manner as to rotate wheel 60 so as to rotate shaft 32 in a clockwise direction as viewed in Fig. 1. This causes valve member 46 to move to the position shown by the dash-and-dot lines in Fig. 1 and causes arm 64 to move to a vertical position as shown by dash-and-dot lines. Arm 64 strikes the resilient member 72 and is retained in the recess formed at 74 and is thus held in a vertical position. In this position valve member 46 is behind wedge-shaped member 76 in the line of flow which protects it from the stream of powdered fuel and air which is admitted into housing 10 through inlet opening 12 and is thereby protected from abrasive action of the powdered fuel.

If it is desired to admit powdered fuel to the right hand conduit 30 only, wheel 60 is further rotated so that valve member 46 will be rotated so as to close the opening in closure member 20 which communicates with the left hand conduit 30. Valve member 46 will be held in this position by means of counter-weight 66 on arm 64 which will now be in a substantially horizontal position but on the opposite side from the position shown in Fig. 1.

The form of distributing valve shown in Figs. 3 and 4 is so constructed that both of the conduits 30 may be closed at the same time. This form comprises a housing 10 provided with an inlet 12 around which is formed a flange 14 to which may be secured a conduit leading from a source of powdered fuel. Closure member 20 is secured to the other end of housing 10 by means of bolts 18 which pass through the closure member and through flange 16 formed on the housing. Closure member 20 is provided with a pair of outlet openings 22 which communicate with the conduits 30. Openings 22 are surrounded by raised rims 24 on the outer periphery of which are formed valve face seats.

Secured to the inner central portion of closure member 20 is a bearing 80 in which are journalled the inner ends of a pair of shafts 82 and 84. Shaft 82 extends through a bushing 86 screwed into a boss 88 formed on the outside of housing 10, while shaft 84 extends through a similar bushing 90 screwed into a boss 92 formed on the other side of housing 10. Secured to the outer end of shaft 82 is an arm 94 which carries a counter-weight 96, while an arm 98 provided with a counter-weight 100 is secured to the outer end of shaft 84.

Keyed to the inner end of shaft 82 is one arm 102 of a valve member 104. Another arm 106 of the valve member is loosely journalled on a shaft 84. Keyed to the inner end of shaft 84 is one arm 108 of a valve member 110, while the other arm 112 of this valve member is loosely journalled on shaft 82.

Each of the valve members 104 and 110 is provided with a cone-shaped valve face 114 which fits the valve face seats formed on rims 24. Secured within housing 10 near the inlet 12 thereof is a wedge-shaped member 116 provided with an inner extension 118 which serves as a stop for valve members 104 and 110 when they are in open position.

Secured to the outer side of closure member 22 directly above shaft 82 is a member 120 to which is pivoted a latch member 122. A similar member 124 provided with a latch 126 is secured to closure member 22 directly above shaft 84.

The above described device operates as follows:

If it is desired to admit powdered fuel to the right hand conduit 30 only, the valve is placed in the position shown in Fig. 3. In this position valve member 104 is in a substantially vertical position behind wedge-shaped member 116. Arm 94 carrying counter-weight 96 is likewise in a vertical position where it is retained by latch 122. Valve member 110 is in closed position with its face 114 in contact with the valve seat face formed on rim 24 around outlet opening 22 which communicates with the left hand conduit 30. Valve member 110 is held in this position by the action of counter-weight 100 on arm 98 which is keyed to shaft 84.

If it is desired to supply powdered fuel to both of the conduits 30, arm 98 is rotated to a vertical position where it will be retained by latch 126, which may be raised by hand to allow the arm to take a vertical position and then lowered so as to embrace the arm and retain it in this position.

If it is desired to close both of the conduits, latch 122 engaging arm 94 is raised and the arm rotated so as to bring valve member 104 in closing position with relation to outlet opening 22. The valve member will be held in this position by the action of counter-weight 96.

Thus it will be seen that I have provided a simple and sturdy form of distributing valve, the faces of which valve are not subject to wear by the abrasive action of the fuel stream passing through the valve, inasmuch as these faces are kept out of the fuel stream. Moreover, my improved valve has proved to provide a tight closing and this is due in part to the fact that the force of the fuel stream tends to seat the valve and not to open it.

While I have described two more or less specific forms of my invention, it is to be understood that changes, additions or omissions which are apparent to one skilled in the art fall within the scope of my invention, which is to be limited only by the breadth of the appended claims.

What I claim is:

1. In a valve of the type described, a hollow member having an inlet opening, a member secured to said hollow member provided with a pair of outlet openings therethrough, a valve member pivotally mounted between said openings, means for rotating said valve member so as to close either of said outlet openings, means for retaining said valve member in a neutral position such that both of said outlet openings are open and means for shielding said valve member from the material passing through said valve when said valve member is in neutral position.

2. In a valve of the type described, a hollow member having an inlet opening, a member secured to said hollow member provided with a pair of outlet openings therethrough, valve means pivotally mounted between said openings, means for rotating said valve means so as to close either of said outlet openings, a baffle within said hollow member, and means for retaining said valve means in an open position behind said baffle.

3. In a valve of the type described, a hollow member having an inlet opening, a member secured to said hollow member provided with a pair of outlet openings therethrough, a shaft extending through said hollow member, an arm secured to said shaft within said hollow member, a valve member mounted on said arm and adapted to close either of said outlet openings, an arm secured to said shaft and extending substantially horizontally when said valve member is in closed relationship with either of said outlet openings, means for retaining said arm in an intermediate position so that the valve is retained in open relationship with both of said outlet openings and means for shielding said valve member from the material passing through said valve when said member is in intermediate position.

4. In a valve of the type described, a hollow member having an inlet opening, a member secured to said hollow member provided with a pair of outlet openings therethrough, a pair of shafts within said hollow member, a valve member secured to each of said shafts, means for rotating each shaft so that said valve members will close said outlet openings, baffle means within said hollow member, and means to retain either shaft in a position such that the valve member secured thereto is behind said baffle and the respective outlet opening is open.

5. In a valve of the type described, a hollow member having an inlet opening, a member secured to said hollow member provided with a pair of outlet openings therethrough, a pair of shafts within said hollow member, a valve member secured to each of said shafts, a weighted arm secured to each shaft and arranged to rotate the shaft to bring the valve member secured thereto into closing relationship with an outlet opening, a baffle within said hollow member and means for retaining each arm in a position such that the valve member associated therewith will be in open position and behind said baffle.

6. A valve mechanism for controlling the flow of materials comprising a housing having a pair of ports therein, a valve member mounted between said ports, said valve member having opposed seat faces adapted to form a closure for said ports, said faces being normally out of the path of material flow when either of said ports is closed, means for retaining said member in an intermediate position for opening both of said ports, and means for shielding said member from the material flow when in said intermediate position.

7. A valve mechanism comprising a housing having a pair of ports formed therein, a pair of transverse rods pivoted coaxially in said housing, valve members adapted to close said ports, each of said valve members being mounted on a yoke journalled on one of said rods and secured to the other of said rods, and control means associated with said rods for controlling the position of said members.

8. A valve mechanism comprising a housing having a pair of ports formed therein, a pair of transverse rods pivoted coaxially in said housing, valve members adapted to close said ports, each of said valve members being mounted on a yoke journalled on one of said rods and secured to the other of said rods, control means associated with said rods for controlling the position of said members, and a stop member associated with said housing and engaging said members when in open position, said stop member forming a shield for deflecting material from said members.

9. A valve mechanism comprising a housing having a pair of ports formed therein, a pair of transverse rods pivoted coaxially in said housing, valve members adapted to close said ports, each of said valve members being mounted on a yoke journalled on one of said rods and secured to the other of said rods, control means associated with said rods for controlling the position of said members, said means comprising an arm associated with each of said rods and extending substantially horizontally when said ports are closed, each of said arms having a weight mounted thereon for maintaining said members in closing position.

10. A valve comprising a housing having an inlet port and a plurality of outlet ports spaced from each other and from the inlet port, valve means disposed in the housing, means for operating the valve means effective to close one of the outlet ports while at least one of the other outlet ports remains open, and means disposed normally in the path of flow of the material passing through the housing for shielding the valve means when the outlet ports are open.

11. A valve comprising a housing having an inlet port and a plurality of outlet ports spaced from each other and from the inlet port, each of the outlet ports having a valve seat disposed out of the normal path of flow of the material through the housing, valve means disposed in the housing, means for operating the valve means effective to close one of the outlet ports while at least one of the other outlet ports remains open, said valve means having a face adapted to contact with the valve seat of the closed outlet port, and means disposed normally in the path of flow of the material passing through the housing for shielding the valve means when the outlet ports are open.

12. A valve comprising a housing having an inlet port and a pair of outlet ports, a pair of shafts mounted in the housing, a valve member secured to each shaft, means for moving the shafts to cause the valve members to close said outlet ports, baffle means in the housing, and means to retain either shaft in such position that the valve member secured thereto is protected by the baffle means and the outlet port closed thereby is opened.

13. A valve comprising a housing having an inlet port and a plurality of outlet ports, a plurality of valve members movably mounted in the housing, one for each outlet port, means for moving the valves to cause them to close said outlet ports, baffle means in the housing, and means to retain any valve in such position that it is protected by the baffle means and the outlet port closed thereby is opened.

14. A valve comprising a housing having an inlet port and a pair of outlet ports, a pair of valve members movably mounted in the housing, one for each outlet port, means for individually moving the valves to cause them to close said outlet ports, baffle means in the housing, and means to retain either valve in such position that it is protected by the baffle means and the outlet port closed thereby is opened.

15. A valve comprising a housing having an inlet port and a plurality of outlet ports, each outlet port having a valve seat disposed out of the normal path of flow of the material through the housing, valve means disposed in the housing, means for operating the valve means effective to close one of the outlet ports while at least one of the other outlet ports remains open or to maintain all outlet ports open, said valve means having a plurality of faces adapted to engage the seats of each outlet port when closed, and means disposed normally in the path of flow of the material passing through the housing for shielding the valve means when one or more of the outlet ports are open.

MARTIN FRISCH.